Aug. 16, 1960 W. L. SHEPARD 2,949,500

TELEVISION CAMERA SYSTEM

Filed June 10, 1958 2 Sheets-Sheet 1

INVENTOR:
WAYLAND L. SHEPARD,
BY Joseph P. Kates
HIS ATTORNEY.

INVENTOR:
WAYLAND L. SHEPARD,
BY Joseph P. Kates
HIS ATTORNEY.

United States Patent Office 2,949,500

Patented Aug. 16, 1960

2,949,500

TELEVISION CAMERA SYSTEM

Wayland L. Shepard, Liverpool, N.Y., assignor to General Electric Company, a corporation of New York Filed June 10, 1958, Ser. No. 741,156

12 Claims. (Cl. 178—7.2)

The present invention relates to a method and apparatus for reversing video in a film television transmission camera system and more particularly relates to a means and method for reversing video in utilization of a television camera and associated transmitting system with both negative and positive film.

Prior art methods and apparatus for reversing video required readjustment of blanking each time the video was reversed because of use of either a negative or a positive film. In addition, prior art systems had disadvantages in that contrast control changes changed the set-up as adjustment was effected for contrast. In utilizing such prior art systems, therefore, operation of a camera channel was made very difficult in equipment required to televise both positive and negative films. The present invention eliminates these and other disadvantage of the prior art and provides for a relatively inexpensive and simple apparatus for video reversal whereby a television station may be easily and quickly made adaptable for transmission utilizing either positive film which is usually utilized in conventional movie film work or for utilizing negative films which are customarily made in shooting local scenes. Additionally, the present invention provides an improved color television transmitting system in which necessity for adjusting the gain of individual channels to provide the same output at the white level and then to adjust the blanking level so the blacks are at the same level is avoided.

Accordingly, an object of the present invention is to provide a means and method for readjustment of a television camera system to provide for rapid adaptation of the system for use with either negative or positive movie films.

Another purpose of the present invention is to provide a television video channel reversal means which will eliminate changing in the set-up and extensive readjustment of blanking each time the video is reversed.

Another aim of the present invention is to provide a novel way of reversing video for use with the transmission of either negative or positive films which will involve a minimum of circuit changes and which will be simple and efficient in operation.

Another object of the present invention is to provide a means and a method for reversing video for use with the transmission of both negative and positive films wherein system blanking is to be utilized.

Another purpose of the present invention is to provide a means and a method for reversal of a television system when changes from positive to negative film and vice versa are necessary and in which a minimum of change of the clamping and clipping circuitry will be required and wherein these changes are effected in a simple manner with a minimum addition of circuit elements.

Another aim of the present invention is to provide a method and apparatus for adjusting gain of the individual channels of a color television broadcasting system to have the same output at the white levels and to adjust blanking level so that the blacks are at the same level.

While the novel and distinctive features of the invention are particularly pointed out in the appended claims, a more expository treatment of the invention, in principle and in detail, together with additional objects and advantages thereof, is afforded by the following description and accompanying drawings in which:

In utilizing a television camera and particularly in areas wherein relatively small television stations are located in which it is sometimes desired to use negative film for local scenes, for example, and wherein very often positive film will also be utilized such as in broadcasting of motion pictures, it is desirable to supply a television transmitting system which will enable the rapid change of circuitry required for such conversion with a minimum of adjustment for economical operation of a local station. In addition for color television broadcasting, it is important that each color channel be adjusted for optimum black and white levels.

Figure 1:
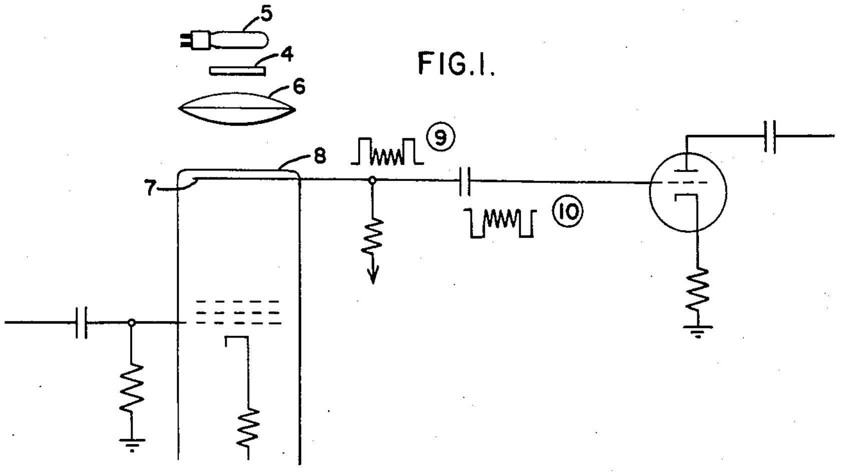
Fig. 1 is a schematic representation of a portion of a television camera employing a vidicon camera tube, for example, to illustrate generation of video waveforms upon electronically scanning the image produced by a positive and a negative film respectively.

Referring now to Fig. 1, in transmitting a television broadcast of a film, an object such as the illustrated film 4, either positive or negative as required which may be illuminated by light source 5, may be projected through converging lens system 6 upon the photoconductive surface 7 of, for example, a vidicon tube 8. The waveform signals designated 9 or 10 respectively may be generated by the striking of light upon the photoconductive surface 7 of the vidicon tube 8 according to utilization of positive or negative film, respectively. In the case of positive film, the light will be projected through the positive such that the whites are transparent due to the characteristics of the film and the black is opaque, the greys, of course, being in between. As a result thereof, the wave form 9 will be generated, for example, and if negative film is utilized wherein the reverse takes place and the whites are opaque and the blacks are transparent, the waveform 10 will result at the input to the video preamplifier. It will be understood, of course, that the invention is not limited to use in a system employing a vidicon camera tube. Systems embodying other types of television camera tubes such as the image orthicon tube may be utilized as well, the vidicon tube 8 being shown by way of illustration of the principles of the invention. The invention, of course, is not limited to black and white television, utilization for purposes of color television, both closed circuit and broadcasting, and for black and white television broadcasting including closed circuit and various other applications may be effected.

Figure 2:
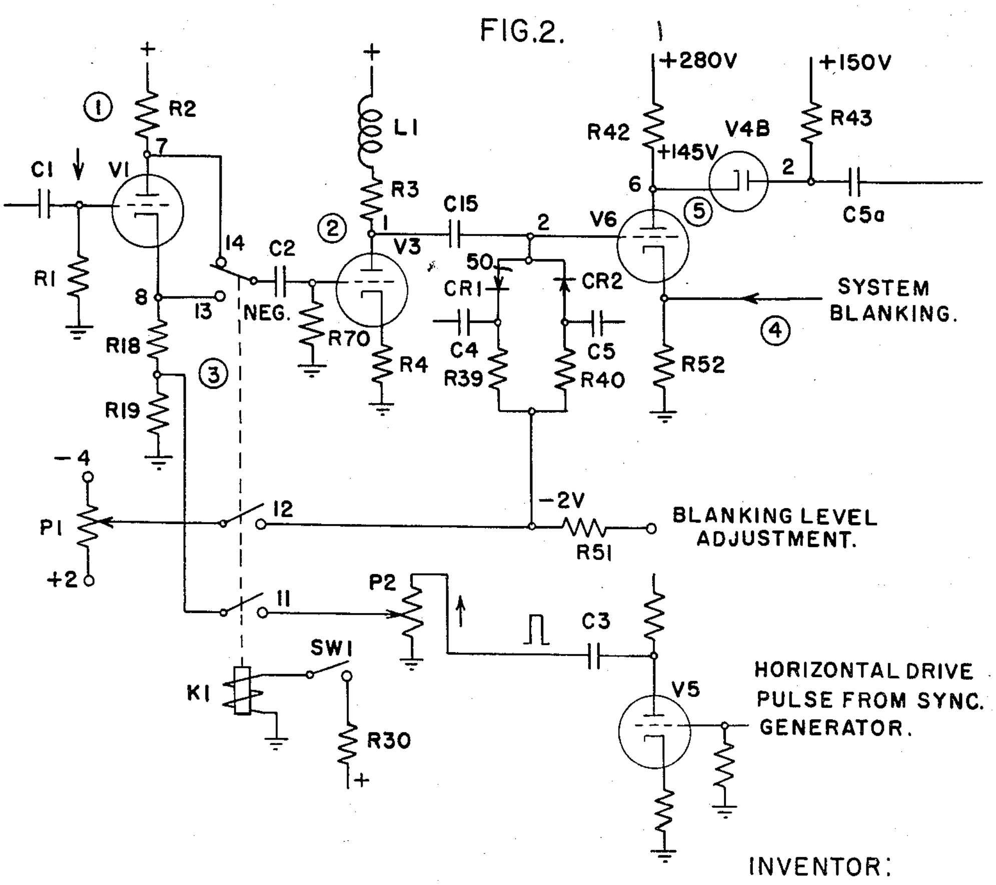
Fig. 2 is a schematic representation of an electrical circuit illustrating a preferred embodiment of the inventive circuit of the present invention.

Referring now more particularly to Fig. 2 wherein is shown a portion of a video amplifier circuit embodying the present invention, a first amplifier stage V1 may be provided which may optionally be used as a phase inverter in a manner which will be described or which may be utilized as a cathode follower. An in-phase or 180° out-of-phase signal voltage may be procured from stage V1 as will be brought out in the operational description by taking output either from the anode of stage V1 or from its cathode. Stage V1 may be a triode, for example, and may have an anode, a control electrode and a cathode. Disposed at the input to the control electrode may be an input coupling capacitor C1 and between the control electrode and ground may be disposed a grid resistor R1. From the source of positive supply to the anode may be disposed an anode load resistor R2. Cathode load resistors R18 and R19 may be disposed between the cathode of stage V1 and ground. Resistor R18 may have one end tied to the cathode of stage V1 and may have in series therewith a second resistor R19 having its end opposite the end connected to resistor R18 connected to ground. Resistors R18 and R19 may, when using negative film, act as a voltage divider for a purpose which will be described hereinafter. A potentiometer P1 may be provided and may have thereacross a voltage spread from a positive terminal (which may be at plus 2 volts) to a negative terminal (which may be at minus 4 volts). A switch SW1 may be provided and disposed between the switch SW1 and a positive source of voltage may be a current limiting resistor R30. Between switch SW1 and ground may be disposed a coil of a relay K1. Relay K1 may have a plurality of pairs of contacts 11, 12, 13 and 14 respectively. Contact 13 may be electrically connected directly to the cathode of stage V1. Contact 14 may be connected electrically to the anode of stage V1. Contact 12 may be connected to the contact arm of potentiometer P1. Contact 11 may be connected to the junction between resistors R18 and R19 in the cathode circuit of stage V1. Connected to contact 14 opposite the end connected to the anode of stage V1 when in positive film position of contact 14 may be a second coupling capacitor C2. Capacitor C2 may be coupled between contact 14 of relay K1 and the control electrode of a second stage V3. Stage V3 may have an anode, a control electrode, and a cathode. Disposed between the cathode of stage V3 and ground may be a cathode resistor R4. Disposed in the anode circuit of stage V3 may be an output developing load resistor R3 and an inductor L1. The end of inductor L1 opposite the end connected to resistor R3 may be connected to a source of positive voltage. Inductor L1 may be provided for frequency compensation in order to make the frequency response curve at the output of stage V3 show a flat response over a comparatively wide band of frequencies. A grid resistor R70 may be disposed between the control electrode of stage V3 and ground. A stage V5 may be provided for to provide a horizontal drive pulse input from the sync generator of the television broadcasting system. Stage V5 may comprise an anode, a control electrode, and a cathode. Disposed between the anode of stage V5 and one end of the resistive portion of a potentiometer P2 may be a coupling capacitor C3. The other end of the resistive portion of potentiometer P2 may be connected to ground. The contact arm of potentiometer P2 may have the end opposite its contact arm connected to contact 11 of relay K1 so as to permit pulses therethrough when relay K1 is in negative film position. As shown in Fig. 2, the relay K1 is in film positive position. Stage V6 may be provided having an anode, a control electrode, and a cathode. The anode of stage V6 may be tied to a positive 280 volts source, for example, through a resistor R42 which may be of the order of 20K ohms. Disposed between the anode of stage V3 and the control electrode of stage V6 may be a coupling capacitor C15 which may be of the order of 1500 mmf. (micromicrofarads). A clamping device generally designated at 50 may be disposed between the control electrode of stage V6 and the contact 12 of relay K1. Clamping or switching device 50 may comprise a diode network such as shown or may be a signal translating stage or other type of clamping network known to the art. In the embodiment shown, input coupling means are provided by the capacitors C4 and C5 to provide for coupling in the clamping pulse to operate the clamping device so that the clamping device 50 will be operative only during periods of blanking pulse. Voltages of opposite polarity will be introduced respectively, through capacitors C4 and C5. Between the control electrode of stage V6 and ground may be a first arm comprising a diode CR1 which may have its plate or anode connected to the control electrode of stage V6 and its cathode connected to the capacitor C4. Disposed between the connection between diode CR1 and the capacitor C4 may be one end of a resistor R39. Resistor R39 may have its other end electrically tied to contact 12. A blanking level adjustment voltage may be provided by resistor R51 which is disposed between the blanking level voltage input and the contact 12 to which is attached the potentiometer P1 slider arm. The resistive portion of potentiometer P1 may be disposed between −4 and +2 volts as stated. This adjustment may be made, for example, to provide a clamping voltage of the order of negative 2 volts at the junction between resistor R39 and resistor R51. A resistor R40 may be disposed between contact 12 and coupling capacitor C5. Disposed between the junction of coupling capacitor C5 with resistor R40 and the control electrode of stage V6 may be a second diode CR2 which may have its cathode tied to the control electrode of stage V6 and may have its anode or plate connected to the capacitor C5. The cathode of stage V6 may have a resistor R52 which may be of the order of 150 ohms disposed between its cathode and ground. Impressed directly on the cathode will be the system blanking voltage from the synchronizing generator, amplifier and clipper system (not shown). Electrically tied to the anode of stage V6 may be the cathode of a diode V4*b*. The anode of diode V4*b* will couple the video output voltage through coupling capacitor C5*a*. Disposed between the anode or plate of diode V4*b* and a positive 150 volts supply may be a resistor R43.

Operation of the circuit of Fig. 2 is as follows:

The video signal from the vidicon or other television camera tube circuit may be coupled through capacitor C1 to the control electrode of amplifier V1. When the video signal is from a positive film output, the switch SW1 will be in open position as shown and the contacts will be in the positions shown on the drawing with contact 14 closed, contact 13 open, contact 12 open, and contact 11 open. In this condition phase inversion of the input video signal may take place; the output of the anode of stage V1 being coupled through capacitor C2 to the control electrode of stage V3 where the video signal may again be amplified, and inverted. The video signal may be then passed through coupling capacitor C15 and clamped to an approximately minus 2 volts by means of clamping device 50.

Figure 3:
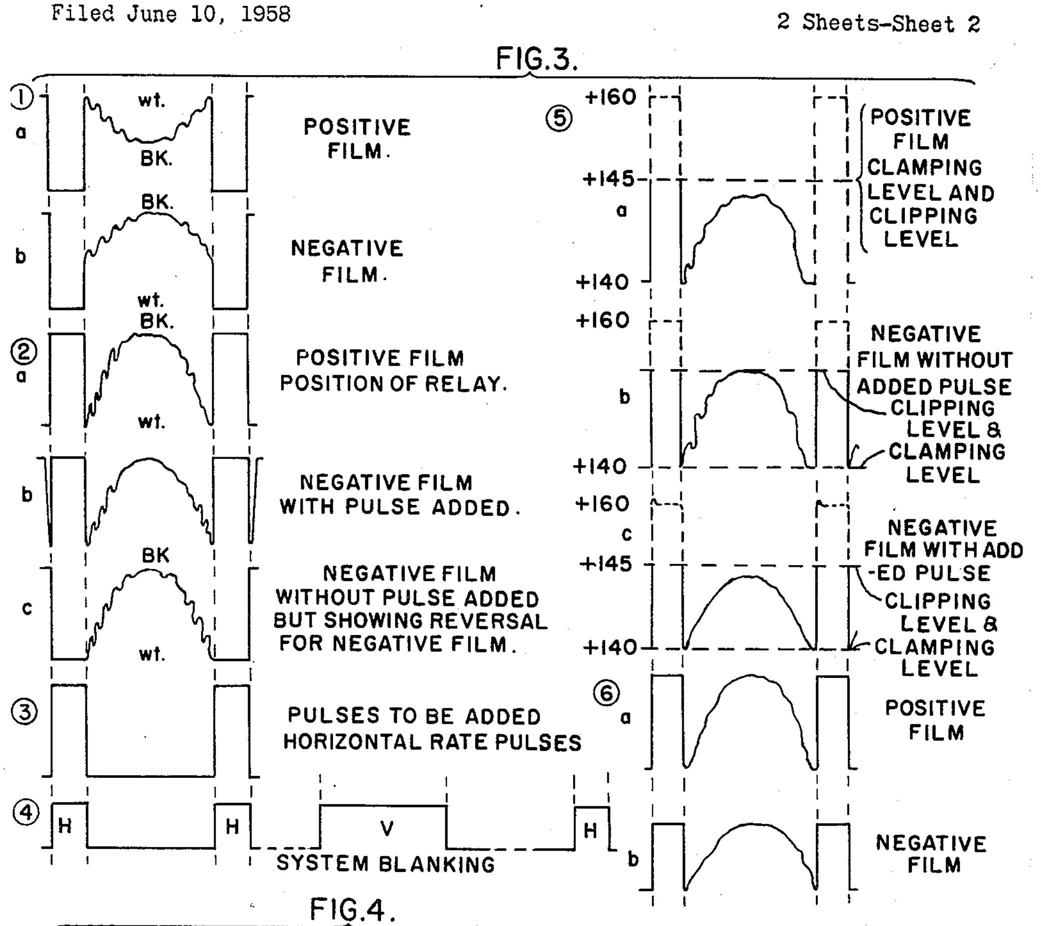
Fig. 3 is a representation of the waveforms occurring at designated points in the circuitry of Fig. 2 and waveforms presented by way of explanation in utilizing the present invention.

Referring now to Fig. 3, in positive film projection condition, the waveform shown at *a* in each case will occur at the position indicated on the drawing. For example, in the input at 1, a negative blanking pulse followed by the video signal as shown at 9 in Fig. 1A will result. The signal will be inverted as shown at 1A of Fig. 3 at the input to stage V1. At the control electrode of stage V3 as indicated at 2, the waveform 2*a* showing a positive blanking pulse followed by the video signal in a positive direction will result. With the signal clamped by means of clamp 50, the output waveform shown at waveform 5*a* of Fig. 3 will result with the use of positive film. Clipping will thereby be effected by diode V4*b* as follows:

With the level clipped at approximately minus 2 volts, the waveform shown in 5*a* of Fig. 3 utilizing positive film will result at the anode of stage V6 (shown at 5 in Fig. 2). By means of the diode V4*b*, clipping will be established at the dashed line shown in 5*a* of Fig. 3 at the point marked plus 145 volts thus extending the useable range of the transmitter as follows. Should the signal applied become less negative than minus 2 volts, then additional plate current will result which would cause the dashed portion shown above the 145 volts, line of 5a of Fig. 3, to result. Under these conditions, since appreciably no reverse current flow takes place through stage V4b, the portion of the signal above 145 volts will not be coupled through to the video output. However, the portion of the signal below 145 volts will be accurately coupled through coupling capacitor C5a because the diode V4b will act as a short in conditions of voltage under plus 145 volts at the anode of stage V6. Thus, the waveform at 5a of Fig. 3 will be accurately followed for the portion underneath the dashed line, that is at plus 145 volts at 5a of Fig. 3. However, by correct clamping and proper choice of clipping level, the spread between the most positive portion of the video signal and the most positive portion of the blanking pulse will remain minimum yet optimum to enable maximum efficient use of transmitter output.

Now assume that it is desired to broadcast from a studio or other broadcast point using negative film. With the use of negative film phase inversion at stage V1 is no longer desirable. Thus, prior to inserting the negative film a button (not shown) to close switch SW1 may be pressed thus causing the contacts 11, 12, 13 and 14 respectively to be switched to the opposite position from that shown in Fig. 2. The video signal is then coupled from the cathode of stage V1 through coupling capacitor C2, amplified in stage V3 and coupled through coupling capacitor C15 to the changed clamping position at the control electrode of stage V6. The signal is there clamped (in the reverse direction) to the same voltage level except that the signal will be going in the opposite direction from the direction of the signal when positive film was utilized.

In order to take care of tolerances because of the difference in desired clamping level as between using positive film and negative film, the contact 12 being closed will change the clamping voltage slightly from minus 2 volts to the desired voltage in accordance with the adjustment of the potentiometer P1 which may be adjusted semi-permanently for the use of negative film. Potentiometer P1, it should be understood, is to merely take up small differences in tolerance, the major portion of adjustment being made by means of potentiometer P2 which is connected through contact 11 in closed position of relay K1 to the junction between resistors R18 and R19. The horizontal drive pulse from the sync generator which is synchronized with the blanking pulse is fed through stage V5 and through coupling capacitor C3 thence through the potentiometer P2 and the contact 11 in closed position to the junction between resistors R18 and R19. The output signal from the cathode of stage V1 will now be coupled through coupling capacitor C2, amplified and inverted in stage V3 and applied to the control electrode of stage V6. This will provide not only proper polarity of the video signal but in addition will cause a signal opposite in phase by 180° to be applied at the time of the blanking pulse which signal will be of magnitude to exactly cancel the blanking pulse to be applied to the control electrode of stage V6. Potentiometer P2 therefore must be adjusted such that the amplitude of this signal is exactly or substantially exactly equal to the amplitude of the blanking pulse. Thereby there is provided a means for adjusting the clamping level such that a signal identical to the appearance of the signal when positive film is being utilized is permitted to occur in the case of utilizing negative film. Since now the clamping level has been reestablished in accordance with the clamping and direction utilized for positive film, it is thus insured that at the anode of stage V6 proper clipping will be effected for a negative film as well as for a positive film. This is shown by reference to 5b and 5c of Fig. 2. At 5b of Fig. 2 is shown the waveform that would be present utilizing negative film without the added pulse provided by the utilization of the circuit including potentiometer P2 and the horizontal driving pulse. In this condition, it may readily be ascertained that although the desired predetermined clamping level could be effected, the clipping circuit would tend to cut out the video portion of the signal which is desired to be transmitted and would leave in the circuit merely the blanking pulses. This, of course, would make for total inability to effect picture transmission, a result which the present invention overcomes without the use of complete manual retuning every time a negative film is inserted.

Restated, referring more particularly to 5b and 5c of Fig. 3, if the inventive circuit were not introduced which is effect cancels the blanking pulse then the output at the anode of stage V6 shown at 5b of Fig. 3 would result. Under these conditions where the anode of stage V6 was above 145 volts, for example, that is the portions showing the video signal that is above 145 volts, no coupling through the capacitor C5 could result because stage V4b would block the passage of current therethrough. It thus can readily be seen that the video signal would be completely cancelled and have zero or low useable output. However, by introducing elimination or cancelling of the blanking pulse by means of the pulse supplied through stage V5 and the potentiometer P2 and fed through contact 11 and from the cathode of stage V1 to eventually be applied at the control electrode of stage V6, it may be seen that the desired waveform shown at 5c of Fig. 3 would result. Under these conditions, the level at which the video waveform is clamped may be at 145 volts (145 volts is chosen by way of example only) and the video signal will be below that voltage. Under these conditions whenever the voltage at the anode of stage V6 was below 145 volts, for example, stage V4b would conduct effecting coupling of the entire signal through capacitor C5. On the other hand, as shown in the dashed line in 5c of Fig. 3, any signal of above 145 volts, which was not eradicated, would be blocked at the diode V4b because the cathode of that diode would then be at a higher potential than its anode. By means of the invention, waveform 6a and 6b respectively of Fig. 3 thus is provided which waveform is required for proper operation whether using positive film or negative film so that a consistent output for viewing by the television audience is insured.

Therefore, by means of the inventive system of cancellation of the blanking pulse when using negative film, the white level is maintained with relation to the entire amplitude of the blanking pulse in the exact same relationship as is provided by the black level with relation to the positive amplitude of the blanking pulse in the case of positive film. To the television viewing audience, however, the effect is identical such that whether or not positive or negative film is utilized, the contrast in the picture will appear identical utilizing the invention. Referring to 2a, 2b and 2c of Fig. 3, a waveform explanation of utilization of the inventive reversal system as contrasted with the effect of former ways of reversing the film to utilize negative instead of positive film is presented. In this figure, waveform 2a shows the waveform at point 2 on Fig. 2 which would result with using positive film in the positive position of the relay. Waveform 2b of Fig. 3 shows the resulting output at point 2 of Fig. 2 utilizing negative film with the inventive method of using the horizontal drive pulse and the circuitry associated with contacts 11 and 12. Without the addition of such circuitry waveform, 2c of Fig. 3 would be the resulting waveform which would occur at point 2 on the diagram of Fig. 2. It may readily be realized that clamping in such case would not be at the correct level of the wave and that in order to adjust clamping, the clamping circuit would have to be extensively adjusted manually before the negative film could be used. System blanking as shown in Fig. 2 is inserted at the cathode of stage V6 to insure that during retrace periods and during periods between frames return may be effected without the return being viewed by the television audience.

Figure 4:
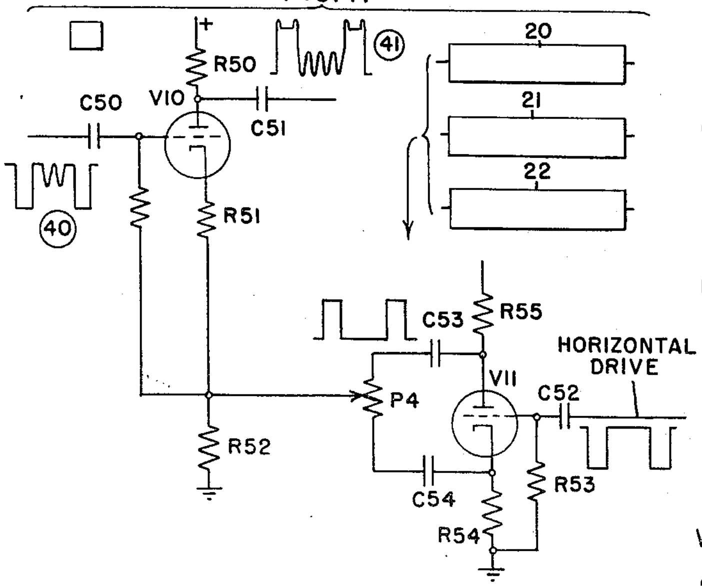
Fig. 4 is a schematic representation of a color camera broadcasting system showing one of the channels in detail utilizing an embodiment of the present invention.

Referring now to Fig. 4, there is illustrated a color camera circuit embodying the "bucking pulse" system of the invention. In Fig. 4, the blocks 20, 21 and 22 illustrate the three color channels for red, green and blue, each of which will have associated therewith the circuit of the lower portion of this figure. In Fig. 4, stage V10 may be a vacuum tube stage, the tube comprising an anode, a control electrode and a cathode. An anode load resistor R50 may be provided between the anode of stage V10 and a voltage supply source. An input capacitor C50 is provided to couple in the input particular color video signal. A capacitor C52 may couple in the horizontal drive pulse which may be applied to stage V11 which may comprise an anode, a control electrode and a cathode. Disposed between the cathode of stage V10 and ground may be a resistor R51 and a resistor R52 in series. The lead of the contact arm of a potentiometer P4 may be connected to the junction between resistors R51 and R52, the ends of the resistance portion of potentiometer P4 being joined to coupling capacitors C53 and C54 coupling output from the anode and cathode of stage V11, respectively. Resistor R55 may provide an anode load resistor for stage V11. Disposed between the cathode of stage V11 and ground may be a cathode resistor R54. Between the control electrode of stage V11 and ground may be disposed a grid resistor R53. Capacitor C53 may couple output from the anode of stage V11 to one end of the resistance portion of potentiometer P4 and capacitor C54 may couple output from the cathode of stage V11 to the other resistance end of potentiometer P4.

Figure 5:
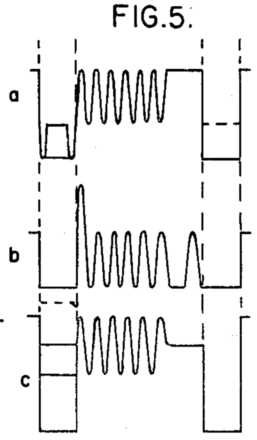
Fig. 5 is a diagrammatic representation of waveforms explaining corrections instituted by the apparatus of Fig. 4.

In color TV applications that do not utilize the principles of the present invention, it would be necessary to adjust the gains of the individual channels to have the same output at the white levels and to adjust the blanking level so the blacks are at the same level. The signal which comes out of an image orthicon tube, for example, depends upon many factors in the tube. Therefore, the signals during blanking will not be identical for each tube. Since the blanking level depends upon the clamping point, if each tube is different in characteristics and operation, the clamping points will differ in relation to the blackest part of the picture. As shown in Fig. 4, therefore, a pulse is added from the synchronizing generator to each of the amplifiers in the red, green and blue channels, respectively and ahead of the clamp stage. Thus, individual semi-permanent adustment of potentiometer settings for corrections of waveforms *a*, *b* and *c* shown in Fig. 5 may be provided for the cancelling or bucking pulse. Thus, the same relationship between black level and clamping level for each color channel is procured so that contrast controls may be adjusted without affecting the black level.

In operation, upon application of video signals, as shown at waveform 40 of Fig. 4, through coupling capacitor C50 to the control electrode of stage V10, the input signal 40 is amplified and inverted as shown at the anode of stage V10 by waveform 41. Waveform 41 without the invention could assume one of the configurations of Fig. 5, that is *a*, *b* or *c*. A horizontal drive synchronizing pulse in opposition to the input synchronizing pulse may be applied through capacitor C52, amplified in stage V11 and applied through capacitors C53 and C54 to the opposite ends of the resistance portion of potentiometer P4. Through the contact arm or sliding arm of potentiometer P4, the signal will be applied in phase with the incoming pulse portion of the signal shown at waveform 40. The signal from potentiometer P4 will be developed across R52 and being in phase with the pulse input to stage V10 and since the grid voltage will follow the cathode voltage, the resulting inverted pulse at the anode of stage V10 will be of magnitude corresponding to the addition of incoming pulse and synchronizing pulse amplitude at the cathode of stage V10. Potentiometer P4 may then be adusted so that in accordance with the pulse amplitude compared to the peaks and troughs of the incoming signal, the waveforms *a*, *b* and *c* of Fig. 5 may be corrected to insure that black and white levels appear on the viewing screen, while simultaneously the height and depth of the synchronizing pulse is just above and below the white and black levels so that maximum efficiency of transmission is insured. This may be done for each of the red, green and blue channels. There thus will appear a picture on the viewing screen in which all color contrasts will be clearly and accurately shown and wherein maximum possible color picture reception will have been permitted.

In summary, therefore, when a television or related system is changed from positive to negative film certain adverse effects result. These are: (1) "set-up" or blanking level change, (2) the black level will not hold when contrast or gain adjustments are changed. The present invention solves both of these problems by changing the D.-C. level of video signal portion and by addition of a pulse to the blanking pulse. It should be realized, of course, that there are two types of blanking levels in these systems, camera blanking and systems blanking. Restated, with conventional video reversal circuits, it is necessary to readjust blanking each time the video is reversed. In addition, the contrast control changes the "set-up" as it is adjusted. Both of these create problems in using negative film in operating a camera channel. By using the relay of the invention, however, either polarity of video can be applied to provide a cheap and simple means of video reversal. In order to make the blanking level remain the same, another contact of the relay may be used to switch on adjustable voltage to the blanking level control. This voltage may be such as to readjust the blanking level when the video is reversed. Since the clamps act on the blanking portion of the signal, when the contrast is adjusted, the level would go up and down from white level, instead of black level. It is normal for the level to change from its black level. It is also desirable to make the amount of set-up remain constant regardless of the contrast level. If we add a pulse at horizontal rate, and the right polarity to the video, the voltage during blanking can be made to become the same voltage as black level. The level may be made just enough to "buck out" the original blanking pulse. The clamp now clamps at the same voltage substantially as black and now when the contrast is adjusted, the set-up will remain constant. This pulse may be added through the relay contacts to the cathode of the video amplifier.

Another feature contemplated in the inventive device is remote control of the switch actuating control. It is also possible by use of a pair of collar contacts and a conducting point which can be put on the film to automatically switch the video when a piece of negative film is spliced into a program.

It is contemplated as within the scope of the invention, that other methods of cancelling the blanking pulse and inverting the waveform to provide proper level at position 5 of stage V6 can be instituted in view of the above description of the illustrative embodiment. The inventive method and means further contemplates other ways of providing a reverse pulse of proper polarity and of effecting cancellation and adjustment than specifically illustrated in the accompanying drawings.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. Apparatus for reversing video in a television system, said apparatus comprising means responsive to video signals including blanking pulses to amplify said signals, means to clamp said blanking pulses to a predetermined level and means to selectively modify the level of said blanking pulse portion of said video signals to provide for proper relationship therewith with the black and white levels of the video signals to thereby effect maximum efficiency of signals transmission and reception.

2. Apparatus for providing proper levels of blanking voltage with relation to the levels of video signals, said apparatus comprising video signal amplifying means, said video signals comprising a video portion and a blanking portion, means to clamp said blanking portions to a predetermined level, and bucking pulse means to cause opposition to said blanking signals in synchronism therewith an amount of pulse sufficient to cause optimum voltage relationship between the levels of said video signals and the level of said blanking pulse.

3. Apparatus for providing video output of maximum efficiency of transmission selectively when utilizing negative and positive film, said apparatus comprising means responsive to video signals to clamp the level of blanking pulses contained therewith, means to selectively feed a signal to said clamping means of a first and of a second phase, clipping means and means synchronized with said blanking pulse to modify the blanking pulse to thereby provide a blanking level with relation to the video signal levels, on operation of said clipping means to provide for minimum spread therebetween consistent with efficient video output.

4. Apparatus for providing selective television broadcasting of negative and positive film, said apparatus comprising means to provide a video signal responsive to projection of light through said film, means responsive to said means for providing a video signal for providing selective phase inversion and phase continuation of said last-named signals, means to provide selective clamping of said phase-inverted and said phase-continued signal to vary clamping levels selectively in accordance with phase-inversion and phase-continuation, means to provide a horizontal pulse input for a selected one of said phase-inverted and phase-continued signals, means to adjust the pulse level of said last-named means, and means to provide an output signal in accordance with the additive effect of said video signal and said pulse signal to thereby provide a spread between level of said output pulse and level of said video signal to provide for maximum efficiency of broadcast transmitting over the entire light to dark level signal range.

5. The apparatus of claim 4 wherein said selective phase inversion and phase continuation means comprises a relay having a first and a second contact member and means to switch said contact members in accordance with the selective use of positive and negative film for broadcasting purposes.

6. The apparatus of claim 4 wherein said means to provide a pulse includes a switch member, a relay, said relay being actuable to insert said pulse means into said responsive means and to invert said phase inversion and phase continuation means from one position to a second position to thereby provide for proper waveform for negative and for positive film to be broadcast.

7. Apparatus for selectively utilizing negative and positive film in video signal broadcasting, said apparatus comprising means for generating a signal in accordance with light transmitted through selectively negative and positive films, means for amplifying said generated signal and selectively inverting and reproducing the phase of said signal in accordance with the utilization of negative and positive film respectively, said video signal comprising a blanking pulse and an information signal, means to provide a drive pulse in opposition to said blanking pulse, means to selectively insert said opposition pulse in additive relationship with said blanking pulse in utilizing said films, means to selectively clamp the level of said blanking pulse in accordance with film utilization, and means to adjust said selective clamping levels, and means to selectively provide for coupling said clamped signal output at a predetermined level to provide for selective clipping of signals of said negative film and for said positive film.

8. The apparatus of claim 7 including clipping means comprising an amplifier stage having an anode, a control electrode and a cathode, means to insert system blanking at said cathode, and diode means having a cathode disposed at the anode of said clipping means and having an anode to provide output when said signal is under a predetermined clipping level.

9. Means for creating video output of maximum efficiency for utilization selectively with positive and with negative film, said means comprising a camera tube responsive to light from said film, means responsive to the output of said camera tube to selectively apply a phase-inverted output in the presence of negative film and a phase-continued output in the presence of positive film, means to amplify said last-named output, means to provide clamping of said amplified output, said clamping means having means associated therewith to selectively clamp at a first position for positive film and at a second position for negative film, means to amplify said clamped output, and means responsive to said means to amplify said clamped output to provide for clipping of said output of said last-named amplifier to thereby couple a signal of lower than predetermined level, and means to set the reference level of said video signal in accordance with the utilization selectively of positive and negative film.

10. The apparatus of claim 9 wherein said means to set said level includes means to provide a horizontal drive pulse, said horizontal drive pulse being in synchronism with the blanking voltage portion of said video signal, means to adjust the level of said horizontal drive pulse, and means to combine said blanking pulse and said drive pulse in subtractive relationship to thereby provide a blanking pulse of magnitude in relation to the video portion of said video signal to thereby effect clipping at said clipping means such that the black and white levels of said signal will be of maximum desirable amplitude with relation to the amplitude of said blanking pulse.

11. In a television transmitter comprising a plurality of channels, means to provide for close relationship between the level of a blanking pulse of a video signal and the black and white levels associated therewith; said transmitter comprising means to provide a video signal including a blanking pulse, means to provide a pulse in phase synchronization with respect to said blanking pulse, means to apply said synchronizing pulse in opposing additive relationship with said blanking pulse to thereby provide an additive pulse output, means to adjust the level of said applied synchronizing pulse, and means to provide for additive combination to develop combined inputs to thereby provide for exact predetermined spread relationship between the amplitude of said added signal and the amplitude of the video portion of said signal to provide for predetermined desired video signal amplitude with relation to said blanking pulse amplitude to thereby provide for maximum reception and maximum efficiency of television transmission.

12. In a television system comprising a plurality of channels, an amplifier stage having an anode, a control electrode and a cathode, a first and a second resistor disposed between said cathode and ground, an input coupling capacitor to couple video signal input to said control electrode, a third resistor disposed between the control electrode of said amplifier and the junction between said first and second resistors, means to provide a video input signal combining a blanking pulse and video information, means to provide a horizontal drive synchronizing voltage input which will have its phase in correspondence with the phase of the blanking portion of said video signal input, means to develop said horizontal synchronizing pulse, said last-named means comprising an amplifier stag incleuding an anode, a control electrode and a cathode, a resistor disposed between said last-named cathode and ground, a resistor disposed between said last-named control electrode and ground, capacitive coupling means connected to the anode and to the cathode of said last-named stage, a potentiometer having resistance means disposed between said capacitive coupling means from said anode and said cathode, said potentiometer having a slider arm electrically connected between the resistance portion and the junction between said first and second resistors whereby said potentiometer may be adjusted to provide for input synchronizing pulse amplitude in additive relationship with respect to said blanking pulse of said video signal to thereby provide an output pulse of amplitude corresponding to the video portion of said video signal to thereby provide for predetermined desired black and white levels of video signal.

References Cited in the file of this patent

UNITED STATES PATENTS

| | | |
|---|---|---|
| 2,297,461 | Dillenburger | Sept. 29, 1942 |
| 2,315,388 | Bedford | Mar. 30, 1943 |

FOREIGN PATENTS

| | | |
|---|---|---|
| 614,942 | Great Britain | Dec. 30, 1948 |

UNITED STATES PATENT OFFICE

CERTIFICATE OF CORRECTION

Patent No. 2,949,500 August 16, 1960

Wayland L. Shepard

It is hereby certified that error appears in the printed specification of the above numbered patent requiring correction and that the said Letters Patent should read as corrected below.

Column 9, line 41, for "signal" read -- signals --; column 11, line 6, for "stag incleuding" read -- stage including --.

Signed and sealed this 4th day of April 1961.

(SEAL)

Attest: ERNEST W. SWIDER

XXXXXXXXXXX

Attesting Officer

ARTHUR W. CROCKER

Acting Commissioner of Patents